Feb. 18, 1947.   W. F. SCHMIED   2,416,224
MANURE SPREADER
Filed Aug. 7, 1944

Inventor:
William F. Schmied,
By Paul O. Pippel
Attorney.

Patented Feb. 18, 1947

2,416,224

UNITED STATES PATENT OFFICE 2,416,224

MANURE SPREADER

William F. Schmied, Blue Island, Ill., assignor to International Harvester Company, a corporation of New Jersey Application August 7, 1944, Serial No. 548,339

3 Claims. (Cl. 275—5)

This invention relates to a new and improved manure spreader and has for one of its principal objects the provision of means for holding the liquid portions of the manure within the spreader box until such time as it is to be distributed in the fields.

An important object of this invention is to provide a liquid-tight tilted manure spreader in which the liquid portions of the manure will congregate in the downwardly tilted end of the spreader box.

Another important object of this invention is the provision of means for adjustably tilting a liquid-tight manure spreader.

A further important object of this invention is the incorporation of a conveyor within the bottom of a tilted body manure spreader and so arranged that the spreader body will be liquid tight.

A still further important object of this invention is the provision of a liquid-tight manure spreader operable to effect rearward movement of the manure within the spreader without the aid of the customary conveyor.

Another and still further important object of this invention is to provide a manure spreader capable of retaining liquids as well as solids and distributing the liquid and solid portions of the manure in a combined state.

Other and further important objects of this invention will become apparent from the disclosures in the following specification and accompanying drawings, in which.

Figure 1:
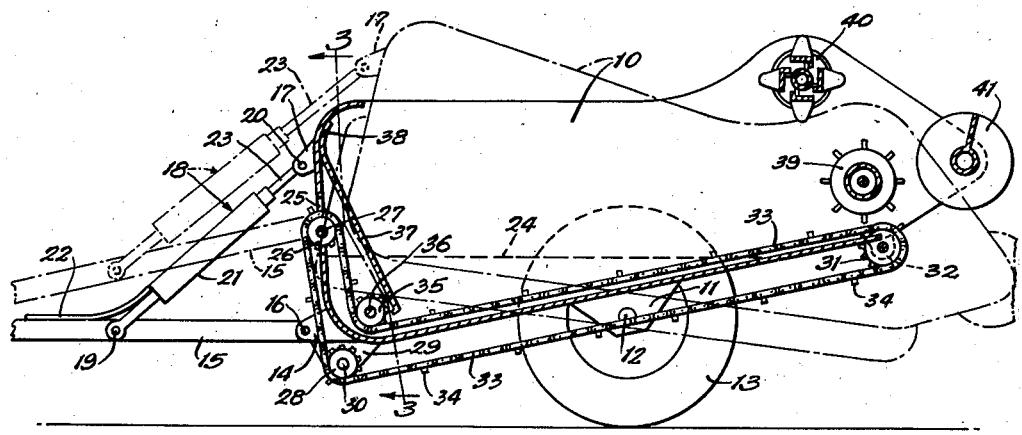
Figure 1 is a longitudinal sectional view of the manure spreader of this invention.

As shown in the drawings, the reference numeral 10 indicates generally a manure spreader box having depending brackets 11. The brackets 11 are positioned on both sides of the box 10 and are adapted to receive through alined openings an axle 12 upon which are mounted wheels 13. At the forward end of the box 10 is a projecting lug 14. A tongue or hitch member 15 is hingedly attached to the lug 14 at 16. The forward end of the tongue 15 is adapted to be fastened to the draw-bar of a tractor or other draft vehicle.

A second lug 17 also projects from the forward end of the box 10 at a point near the top of the box and directly above the lug 14. An extensible member 18 joins the lug 17 and the tongue 15 at 19, and it is apparent that upon extension of this member, the connecting points 19 on the tongue, and 20 on the lug 17 must separate. A further separation of the points 19 and 20 will cause a partial rotation of the box 10 about the axle 12. This results in the tilted position of the box as shown by the dashed lines in Figure 1.

The extensible member 18, as shown, is in the form of a hydraulic cylinder 21 but may be any mechanical or other means. A fluid conduit 22 carries fluid under pressure from the pulling tractor to the hydraulic cylinder 21. A piston (not shown) within the cylinder 18 is forced forwardly and upwardly upon the admission of fluid under pressure to the cylinder 18, so that a piston rod 23 attached at 20 to the lug 17 will be forced out of the cylinder 18 to a position as shown in the dashed lines in Figure 1. It will, of course, be realized that the extensible member 18 may be any one of a number of types such as a mechanical screw.

The bottom of the box 10 is formed of sheet metal and is capable of retaining manure liquids against leakage therethrough. The normal position of the manure spreader box 10 is that position shown in full lines in Figure 1. As manure is put into the box 10, the liquids contained within the manure will tend to flow downwardly by gravity to the lowermost portion of the box, which is the forward end due to the tilting thereof. A liquid level line is shown at 24 in Figure 1, and it is quite apparent that the major portion of manure liquids will not overflow this allotted spaced in the depressed or forwardly tilted portion of the box 10. In order that the customary conveyor may be utilized within the bottom of the spreader box and still not permit the liquid to drain out, a special L-shaped conveyor is employed. An opening 25 is provided in the forward end of the box 10 at a point substantially midway between the top and bottom thereof. Sprockets 26 are journaled for rotation within the opening 25 on a shaft 27. Oppositely positioned alined sprockets 28 are mounted on downwardly depending brackets 29 by means of pins 30. Sprockets 31 are mounted at the rear end of the manure spreader box 10 on depending brackets 32. Conveyor chains 33 extend around the three sets of described sprockets. The chains are interconnected by means of cross-slats 34 which are adapted to move the manure within the box 10 to the distributing elements at the rear of the box. Sprockets 35 are journaled on a shaft 36 within the box 10 and are adapted to hold the chains 33 down against the bottom of the box 10. A shield 37 is fastened to the upper end of the box 10 at 38 and extends downwardly over the sprockets 35. This shield 37 prevents solid portions of the manure from coming in contact with the sprockets 35. The liquid portions of the manure may be maintained in the box to a level determined by the lower edge of the opening 25.

The chains 33 are driven in a clockwise direction as viewed in Figure 1, and as the slats 34 move rearwardly, they carry solid portions of the manure through the liquid congregated in the tilted forward end of the manure box. The solid portions absorb the liquid portions as they are carried rearwardly and by means of beater rolls 39 and 40, the combined liquid and solid manure is fed to the wide spreading auger 41 whereupon the manure is spread over a wide area. As the load of manure diminishes, it is necessary to reduce the angle of incline of the spreader box 10 so that the liquid within the box may be more readily distributed. In order to accomplish this, the spreader box 10 is tilted by means of the extensible member 18, and this guarantees that all the liquid may be distributed in the fields rather than be retained in the spreader after all the solid portions have been distributed. As shown by the dashed lines in Figure 1, extension of the member 18 has placed the rear end of the box 10 at a level below the forward end so that the liquid will positively drain out of the box.

Figure 2:
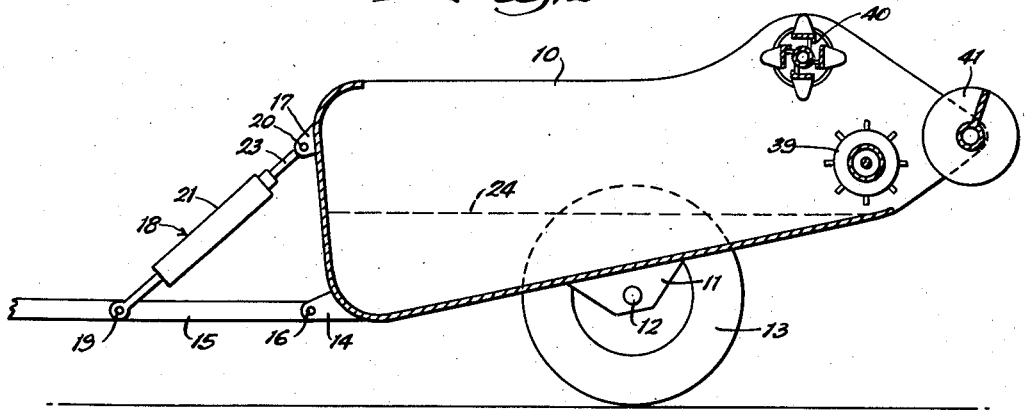
Figure 2 is a further longitudinal sectional view showing a modified form of manure spreader.
Figure 3:
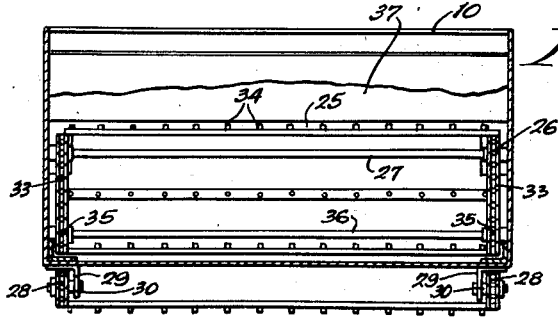
Figure 3 is a sectional view taken on the line 3—3 of Figure 1.

In the modified form of manure spreader, as shown in Figure 2, the conveyor is entirely eliminated. The remainder of the modified box is identical with the box as shown in Figure 1 and the same reference numerals are used to indicate the same parts on both spreaders. It is possible in certain communities to employ a spreader without a conveyor in the bottom thereof and still be able to spread the manure. Particularly on dairy farms the manure contains a high percentage of liquid and is quite slippery, so that mere tilting of the spreader box 10 by means of operating the extensible member 18 will cause the manure to flow rearwardly into the beating and wide spreading elements.

The intention is to limit the invention only within the scope of the appended claims.

1. A manure spreader comprising a longitudinally extending liquid tight forwardly and downwardly inclinde body, said body including a box-like structure with a bottom and upwardly extending sides and ends, a conveyor of the slatted chain type having its inner flight running within the box and having its outer flight running out and back beneath the box, and the conveyor at the forward end of the box extending up and over the forward end of the box, and a shield positioned within the box-like structure between the sides thereof and in front of the portion of the conveyor extending up and over the forward end of the box, whereby the shield prevents solid portions of manure in the box from contacting the upwardly extending portion of the conveyor.

2. A manure spreader comprising a longitudinally extending liquid tight forwardly and downwardly inclined body, said body including a box-like structure with a bottom and upwardly extending sides and ends, a conveyor of the slatted chain type having its inner flight running within the box and having its outer flight running out and back beneath the box, and the conveyer at the forward end of the box extending upwardly and then through an opening in the forward end of the box at a point between its top and bottom, and a partition shield depending from the top of the forward end of the box down over that portion of the conveyor extending up and through the opening in the forward end of the box, whereby solid portions of manure contact only that portion of the conveyor running along the bottom of the box and liquid portions of the manure are combined within the box to the height of the said opening.

3. A manure spreader comprising a liquid tight body normally inclined forwardly and downwardly, distributor means at the rearward end of the body, said body including a box with a bottom and upwardly extending sides and ends, a conveyor of the slatted chain type having its inner flight running along the bototm within the box and having its outer flight running out and back beneath the box, the conveyor at the forward end of the box extending upwardly over a portion of the forward end of the box, a shield positioned in front of the upwardly extending portion of the conveyor and adapted to prevent solid portions of manure from contacting this upwardly extending portion of the conveyor and means for varying the tilt of said box.

WILLIAM F. SCHMIED.

REFERENCES CITED

The following references are of record in the file of this patent:

UNITED STATES PATENTS

| Number | Name | Date |
|---|---|---|
| 2,360,126 | Griffiths | Oct. 10, 1944 |
| 951,073 | Hicks | Mar. 1, 1910 |
| 2,239,029 | Barrett | Apr. 22, 1941 |
| 122,036 | Little | Dec. 19, 1871 |

FOREIGN PATENTS

| Number | Country | Date |
|---|---|---|
| 386,781 | British | Jan. 26, 1933 |
| 461,297 | British | Feb. 15, 1937 |